US006000275A

United States Patent [19]
Nishina et al.

[11] Patent Number: 6,000,275
[45] Date of Patent: Dec. 14, 1999

[54] METHOD FOR ANALYZING IMPURITIES IN GAS AND ITS ANALYZER

[75] Inventors: Akira Nishina; Hitomi Umehara; Tetsuya Kimijima, all of Tokyo, Japan

[73] Assignee: Nippon Sanso Corporation, Tokyo, Japan

[21] Appl. No.: 09/051,800

[22] PCT Filed: Aug. 26, 1997

[86] PCT No.: PCT/JP97/02948

§ 371 Date: Apr. 23, 1998

§ 102(e) Date: Apr. 23, 1998

[87] PCT Pub. No.: WO98/09162

PCT Pub. Date: Mar. 5, 1998

[30] Foreign Application Priority Data

Aug. 27, 1996 [JP] Japan .................................... 8-225671

[51] Int. Cl.[6] ...................................................... G01N 7/00

[52] U.S. Cl. .......................... 73/31.03; 73/1.05; 250/288

[58] Field of Search ................................ 73/1.05, 31.03; 250/288, 252.1

[56] References Cited

PUBLICATIONS

H. Kambara, et al, "Identification of Clusters Produced in an Atmospheric Pressure Ionization Process by a Collisional Dissociation Method", Analytical Chemistry, vol. 51, No. 9, Aug. 1979, pp. 1447–1452.

Kenji Kato et al, "Analysis of Trace Components According to API–MS", Japan Industrial Technology Association, Technical Data 169, pp. 82–90 (1987).

*Primary Examiner*—Hezron Williams
*Assistant Examiner*—Jay L. Politzer
*Attorney, Agent, or Firm*—Oblon, Spivak, McClelland, Maier & Neustadt, P.C.

[57] ABSTRACT

A method of analysis of an impurity in a gas is characterized in that an impurity gas in a sample gas is quantified by ionizing the sample gas, and measuring by a mass spectrometer 6 the intensity of cluster ions which are formed from a main component gas and an impurity gas in the sample gas. In addition, a device for analysis of an impurity in a gas is characterized by comprising a mass spectrometer 6 having a means for ionizing a gas which is introduced thereinto, an analysis line 4 which introduces a sample gas into the aforesaid mass spectrometer 6, and a calibration line 10 which adjusts a concentration of an impurity in the sample gas and thereafter introduces the gas into the aforesaid mass spectrometer 6.

13 Claims, 5 Drawing Sheets

METHOD FOR ANALYZING IMPURITIES IN GAS AND ITS ANALYZER

TECHNICAL FIELD

The present invention relates to methods and devices which are suitable for analysis of trace amounts of impurities in a gas, and in particular, suitable for analysis of trace amounts of gas-phase moisture in oxygen or ammonia, or suitable for analysis of trace amounts of xenon in oxygen.

BACKGROUND ART

In the semiconductor industry or the like, ultrahigh purity gases are used. In recent years, as integration of circuits has progressed rapidly from ICs to LSIs to VLSIs, requirements in achieving ultrahigh purity of gases used in manufacturing processes for these semiconductors have become more stringent.

In addition, among various ultrahigh purity gases used in semiconductor manufacturing processes, highly-sensitive analyses of gas-phase moisture and xenon in oxygen, which are used in oxidation processes, and of trace amounts of gas-phase moisture in ammonia, which is used in formation of insulating nitride films, were difficult.

That is, as a method of analysis of trace components in a gas, a method in which an atmospheric-pressure-ionization mass spectrometer is used has been hitherto known. An atmospheric-pressure-ionization mass spectrometer is a mass spectrometer which is equipped with an ion source to perform ionization under atmospheric pressure. For example, when an analysis of a trace amount of moisture in nitrogen is conducted, since ionization of the nitrogen gas under atmospheric pressure allows charge transfer from the ionized main component ions ($N_4^+$) to coexisting water molecules (charge transfer reaction), and causes an increase in the number of ionized water molecules, highly-sensitive quantification of trace moisture becomes possible. The above reaction of charge transfer from the main component ions to the coexisting molecules occurs only when the ionization potential of the coexisting molecules is less than that of the main component, and therefore, a quantification of trace moisture in argon is possible based on a similar principle.

However, with regard to moisture in oxygen and to xenon in oxygen, since the ionization potential of oxygen (12.07 eV), which is the main component, is lower than the ionization potential of moisture (12.61 eV), which is a trace component, and is lower than the ionization potential of xenon (12.13 eV), such a charge transfer reaction as above does not occur. Accordingly, when an analysis of moisture in oxygen gas was performed in accordance with an analytical method in which a conventional atmospheric-pressure-ionization mass spectrometer was used, although a calibration curve of moisture having a mass number of 19 was obtained, the sensitivity was low; similarly, when an analysis of xenon in oxygen was performed, measurement in a range in which the concentration of xenon was low was difficult.

In addition, it has been known that oxygen and water form cluster ions (Anal. Chem. 51, 1447; H. Kambara, Y. Mitsui & I. Kanomata (1979)), and such cluster ions are uncontrollable in a conventional analytical method, which has also been a cause of difficulty in highly-sensitive analyses.

Furthermore, although in order to obtain a calibration curve of moisture, measurements have been hitherto conducted using a standard oxygen gas having a known moisture concentration which is filled in a container, there was a concern that oxygen might react with moisture in the container, and there was also a problem in that an accurate calibration curve could not be obtained since a standard gas in a container was not consistent at each use over a long period.

Similarly, with regard to moisture in ammonia, since the ionization potential of ammonia (10.16 eV), which is the main component, is lower than the ionization potential of moisture (12.61 eV), which is a trace component, such a charge transfer reaction as described above does not occur. Moreover, it has been known that ammonia also forms cluster ions with moisture, and a highly-sensitive analysis has been difficult (Japan Industrial Technology Association, Technical Data 169, 82, "Analysis of Trace Components According to API-MS"; Kenji KATO, Hiroshi TOMITA, and Noritaka SATO (1987)).

DISCLOSURE OF INVENTION

An object of the present invention is to provide an analytical method and an analytical device which are capable of highly-sensitive detection of an impurity in a gas, such as moisture in oxygen; a highly-sensitive analysis of such a gas has hitherto been difficult using an atmospheric-pressure-ionization mass spectrometer.

The method of analysis of an impurity in a gas is characterized in that an impurity gas in a sample gas is quantified by ionizing the sample gas, and measuring by a mass spectrometer the intensity of cluster ions which are formed from a main component gas and an impurity gas in the sample gas.

In this analytical method, it is desirable that a standard gas consisting of the main component gas and the impurity gas with a known concentration be ionized, the intensity of cluster ions, which are formed from the main component gas and the impurity gas, be measured by a mass spectrometer, a calibration curve which represents a relationship between the concentration of the impurity gas and the intensity of the cluster ions be obtained, and quantification of the impurity gas in the aforesaid sample gas be conducted using the calibration curve.

Furthermore, in this method, it is desirable that a gas obtained immediately after adjusting a concentration of the impurity in the aforesaid sample gas be used as the aforesaid standard gas.

One of the preferred embodiments of the analytical method according to the present invention is an analytical method in which the aforesaid main component gas is oxygen, the aforesaid impurity gas is moisture, and an intensity of ions having a ratio of a mass number M to a charge Z (M/Z) of 50 is applied to an intensity of the aforesaid cluster ions.

Another embodiment is an analytical method in which the aforesaid main component gas is ammonia, the aforesaid impurity gas is moisture, and an intensity of at least one type of ion having a ratio of a mass number M to a charge Z (M/Z) of 35 or 36 is applied to an intensity of the aforesaid cluster ions.

Yet another embodiment is an analytical method in which the aforesaid main component gas is oxygen, the aforesaid impurity gas is xenon, and an intensity of at least one type of isotopic ion having a ratio of a mass number M to a charge Z (M/Z) of 161, 163, 164, 166, or 168 is applied to an intensity of the aforesaid cluster ions.

In the method of analysis of an impurity in a gas according to the present invention, it is desirable that an ionizing condition be adjusted so as to yield a highest relative ion intensity of the cluster ions. Furthermore, it is desirable that the aforesaid ionizing condition be a drift voltage condition.

In the method of analysis of an impurity in a gas according to the present invention, it is desirable that an atmospheric-pressure-ionization mass spectrometer be used as the mass spectrometer.

The device for analysis of an impurity in a gas according to the present invention is characterized by comprising a mass spectrometer having a means for ionizing a gas which is introduced thereinto, an analysis line which introduces a sample gas into the aforesaid mass spectrometer, and a calibration line which adjusts a concentration of an impurity in the sample gas and thereafter introduces the gas into the aforesaid mass spectrometer.

The aforesaid calibration line may comprise a means for removing an impurity in the sample gas and a means for adding an impurity after the removal.

It is desirable that the mass spectrometer which is used in the analytical device according to the present invention be an atmospheric-pressure-ionization mass spectrometer.

BEST MODE FOR CARRYING OUT THE INVENTION

Figure 1:
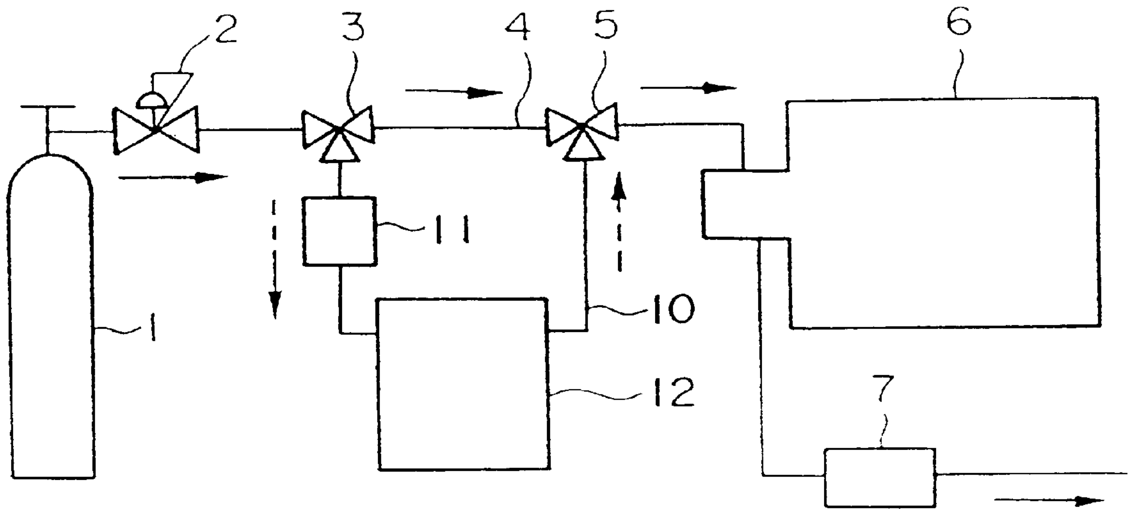
FIG. 1 is a schematic structural illustration showing a working example of an analytical device according to the present invention.

FIG. 1 is a schematic structural illustration showing a working example of an analytical device according to the present invention. This working example will be illustrated with an example wherein a sample gas is analyzed in which a main component is oxygen gas, and in which moisture is contained as an impurity.

In the figure, reference numeral 1 is a cylinder which is charged with the sample gas, and reference numeral 6 is a mass spectrometer. In this working example, an ultrahigh purity oxygen gas cylinder may be preferably used as the cylinder 1. In addition, as the mass spectrometer 6, an atmospheric-pressure-ionization mass spectrometer (hereinafter simply referred to as "mass spectrometer") provided with an ion source for ionizing an introduced gas under atmospheric pressure may be preferably used. As the ion source, one using a corona discharge by a needle-shaped electrode, for example, is preferable.

With this device, the sample gas is supplied from the cylinder 1, the pressure thereof being regulated by a pressure regulator 2, and thereafter the sample gas is directed to an analysis line 4 or a calibration line 10. Switching between the analysis line 4 and the calibration line 10 is performed by a switching valve 3.

This construction allows the sample gas, which is introduced into the analysis line 4, to be introduced into a mass spectrometer 6.

On the other hand, the sample gas which is directed to the calibration line 10 is introduced into an impurity removing means 11, in which impurities are removed so as to yield a refined gas. As such an impurity removing means in this working example, an adsorbent which selectively adsorbs moisture is preferably used.

Subsequently, this refined gas is introduced into an impurity adding means 12, in which an impurity is added so as to yield a standard gas in which the concentration of the impurity is adjusted to a desired level. It is preferable that the addition of the impurity in the refined gas be performed within a short period at a fixed temperature. In this working example, this impurity adding means 12 is preferably constructed so as to yield a standard gas in which a specific concentration of moisture is mixed in oxygen, by way of adding a specific amount of moisture by a diffusing tube or a permeation tube at a fixed temperature, preferably 30° C., and then diluting with another portion of refined oxygen.

The construction allows the thus-obtained standard gas to be introduced into the mass spectrometer 6 via the switching valve 5.

The mass spectrometer 6 is constructed so as to be capable of ionizing the sample gas which is introduced via the analysis line 4 or the standard gas which is introduced via the calibration line 10, separating the thus-produced ions according to their masses, and individually measuring intensities of the ions having various masses (relative ion intensities). The construction allows inspection of a constant flow of the gas, which is to be introduced into the mass spectrometer 6, by using a mass flow controller or mass flow meter 7. The gas which has passed the mass flow controller or mass flow meter 7 is then discharged.

Since the analytical device of this working example is provided with the analysis line 4 and the calibration line 10 in a switchable manner, both measurements for preparing a calibration curve and measurements for analyzing the sample gas can be conducted easily simply by switching the switching valves 3 and 5, and the switching can be performed promptly.

In addition, since the calibration line for making the standard gas from the sample gas is disposed, a standard gas which is filled in a container is not necessary in preparation of a calibration curve. Therefore, the problem of the conventional art, in that a standard gas in a container was not consistent at each use over a long period, can be solved, and an accurate calibration curve can be constantly obtained.

Next, a first working example of the present invention will be illustrated by an example in which oxygen gas containing gas-phase moisture as an impurity is analyzed using an analytical device having the above construction.

Figure 2:
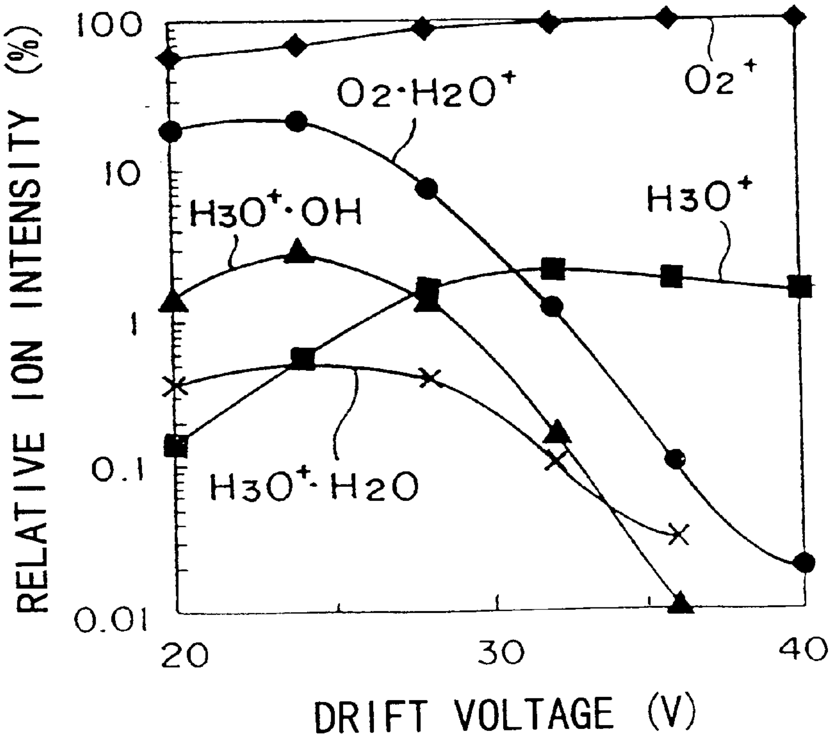
FIG. 2 is a graph showing relationships between the drift voltage at the time of ionizing an oxygen gas containing gas-phase moisture and the relative ion intensity of generated cluster ions.

First, in order to prepare a calibration curve, a sample gas which is supplied from the ultrahigh purity oxygen gas cylinder 1 is allowed to pass the calibration line 10 so as to yield a standard gas, and thereafter, measurements are conducted by setting the switching valves 3 and 5 so that the standard gas can be directed to the mass spectrometer 6. In this working example, the standard gas which is introduced into the mass spectrometer 6 is ionized, whereby oxygen and moisture in the standard gas form cluster ions; cluster ions having ratios of the mass number M to the charge Z (M/Z) of 19 ($H_3O^+$), 36 ($H_3O^+.OH$), 37 ($H_3O^+.H_2O$), and 50 ($O_2.H_2O^+$), which originated from moisture, are respectively generated. Generation ratios of these cluster ions vary depending on ionization conditions in the mass spectrometer 6. For example, FIG. 2 shows relative ion intensities (%) of each type of cluster ion and $O_2^+$ which are measured with respect to oxygen gas containing 200~300 ppb moisture by the mass spectrometer 6 while drift voltage conditions in the ion source were varied in the range of 20~40 V.

In addition, since the pressure in the ionizing portion also affects the clustering reactions, it is necessary to set the ionizing portion at an optimum pressure. In general, the higher the pressure, the more a clustering reaction will tend to proceed; however, when the pressure in the ionizing portion is made high, the pressures in a mass separating portion and detecting portion also increase, as a result of which degradation of the separating power or increase of noise in the detecting portion tends to occur. Accordingly, there is an optimum range of pressure in the ionizing potion according to each device and each type of cluster.

Optimization of these ionization conditions allows selective production of cluster ions, which are objects of the measurement, to be performed efficiently, and allows the thus-produced cluster ions to persist steadily without being dissociating. As a result, highly-sensitive quantification of cluster ions becomes possible.

Then, relative ion intensities of each type of cluster ion are measured while making the moisture concentration in the standard gas is varied by varying the amount of moisture added by the impurity adding means 12 in a condition such that the drift voltage is set at a specific value; thus, calibration curves showing relationships between the moisture concentration and the relative ion intensity of cluster ions are prepared.

Figure 3:
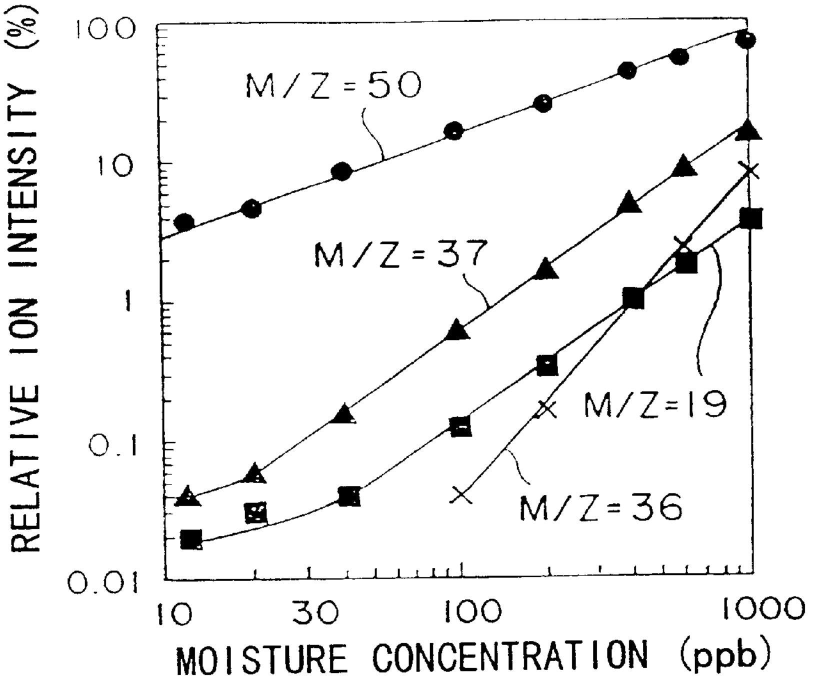
FIG. 3 is a graph showing relationships between the moisture concentration in an oxygen gas containing gas-phase moisture and the relative ion intensity of cluster ions.
Figure 4:
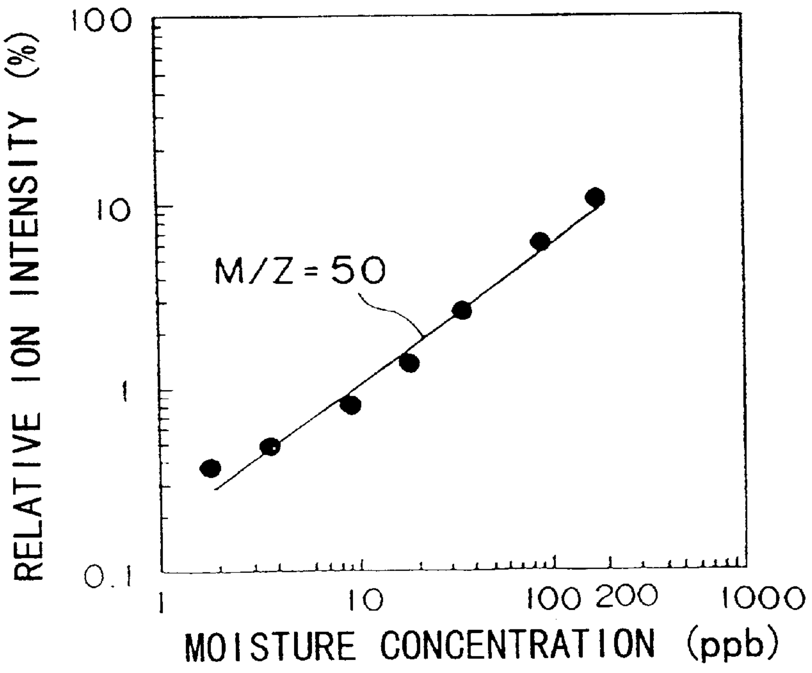
FIG. 4 is a graph showing a relationship between the moisture concentration in an oxygen gas containing gas-phase moisture and the relative ion intensity of cluster ions.

FIGS. 3 and 4 show examples of the thus-obtained calibration curves, in which the horizontal axis indicates a moisture concentration in the standard gas, and the vertical axis indicates a relative ion intensity of cluster ions. In addition, FIG. 3 shows calibration curves of cluster ions having M/Z values of 19, 36, 37, and 50 in the region of relatively high moisture concentrations (10 to 1000 ppb), and FIG. 4 shows a calibration curve of cluster ions having an M/Z value of 50 in the region of relatively low moisture concentrations (200 ppb or lower).

As shown in these figures, as for the calibration curves of the cluster ions of M/Z=19 ($H_3O^+$), M/Z=36 ($H_3O^+.OH$), and M/Z=37 ($H_3O^+.H_2O$), although linearity of the curves is satisfactory in the high concentration region, the linearity becomes worse in the low concentration region. On the other hand, as for the calibration curve of the cluster ions of M/Z=50 ($O_2.H_2^+$), good linearity is obtained in both the high and low concentration regions. In addition, in the region of moisture concentrations of 30 ppb or lower, it is observed that the relative ion intensities of cluster ions of M/Z=19 ($H_3O^+$), M/Z=36 ($H_3O^+.OH$), and M/Z=37 ($H_3O^+.H_2O$) are about 1 to 2 orders of magnitude smaller than those of the cluster ions of M/Z=50 ($O_2.H_2O^+$).

Accordingly, it is seen that a calibration curve of cluster ions of M/Z=50 ($O_2.H_2O^+$), which has good linearity in the low concentration region and has high relative ion intensities, is most preferable for a calibration curve to be used in determination of an amount of moisture in oxygen.

In addition, since there is a 1 to 2 orders of magnitude difference in relative ion intensities between cluster ions of M/Z=50 (which have the highest relative ion intensities) and other cluster ions, the relationship between the total value of relative ion intensities of the cluster ions of M/Z=50 and the other cluster ions and the moisture concentration is almost the same as the relationship according to a calibration curve of M/Z=50 ($O_2.H_2O^+$). Therefore, a quantitative analysis of moisture is also possible using a calibration curve showing a relationship between the total value of relative ion intensities of all cluster ions and the moisture concentration.

On the other hand, when quantification of moisture in the sample gas in ultrahigh purity oxygen gas cylinder 1 is conducted, the switching valves 3 and 5 are switched so that the sample gas from the ultrahigh purity oxygen gas cylinder 1 will be directed via the analysis line 4 to the mass spectrometer 6, and then the measurement is conducted. During measuring, the flow amount, the pressure, the temperature, and the ionizing conditions in the ion source are adjusted to be the same as the conditions during measurements for preparing the calibration curves using the calibration line 10.

Figure 5:
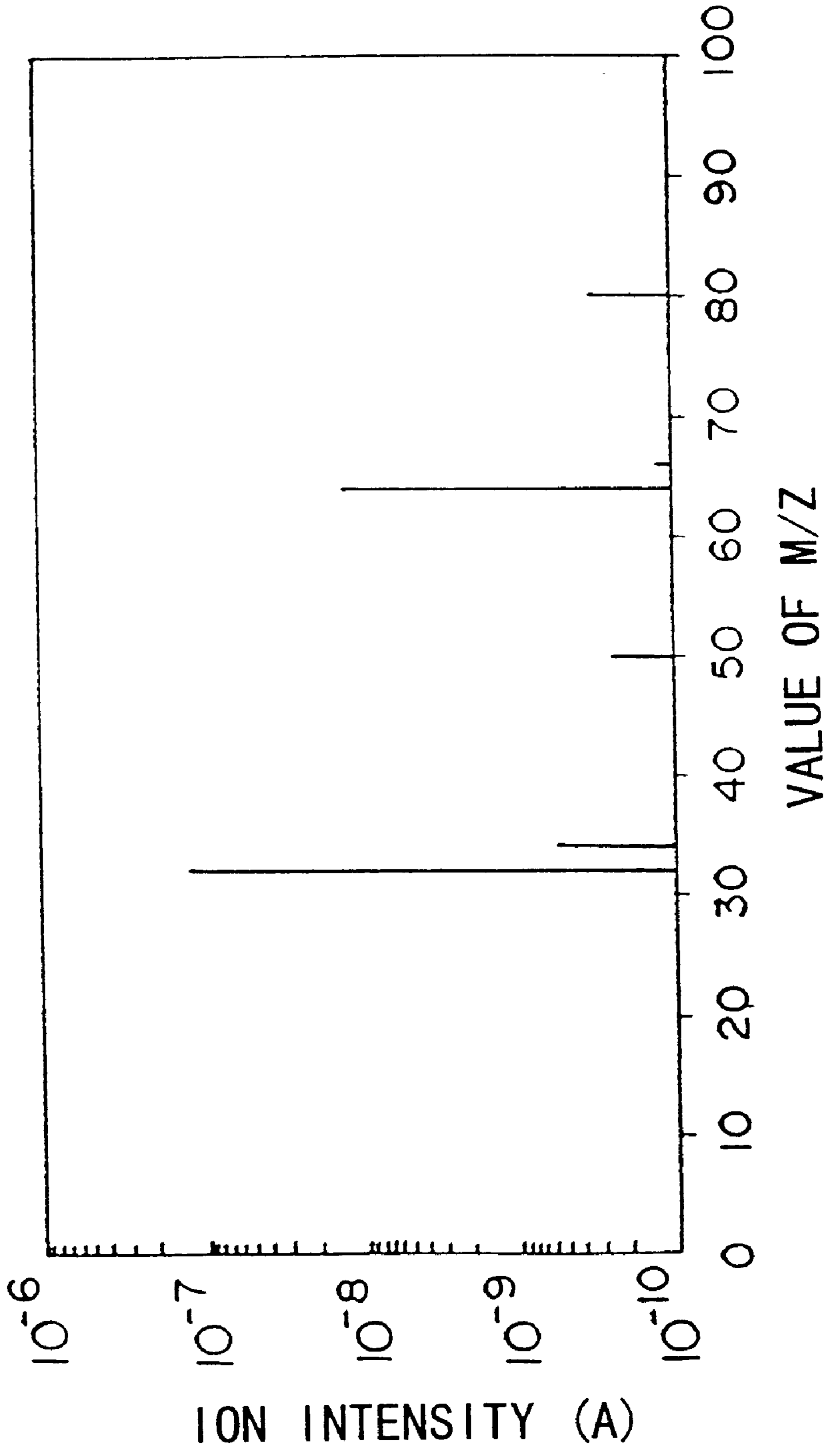
FIG. 5 is a graph showing an example of a mass spectrum obtained by an analysis of moisture in an ultrahigh purity oxygen gas.

FIG. 5 is a graph showing an example of a mass spectrum of a sample gas in an ultrahigh purity oxygen gas cylinder 1, which was measured by a mass spectrometer 6. In this graph, the horizontal axis indicates a M/Z value, and the vertical axis indicates an ion intensity (A).

A quantitative analysis of the moisture concentration in the sample gas is conducted by measuring a relative ion intensity (%) of the cluster ions $O_2.H_2O^+$ using the peak of M/Z=50, which is one of plural peaks observed in the mass spectrum, and reading a moisture concentration corresponding to the value of the measured relative ion intensity in the calibration curve of M/Z=50 ($O_2.H_2O^+$), which has been prepared in advance. As a result, the moisture in the sample gas in the ultrahigh purity oxygen gas cylinder 1 in the present working example was 2.7 ppb.

According to the analytical method of this working example, a calibration curve having good linearity can be obtained by finding a relationship between the relative ion intensity of cluster ions and the moisture concentration, the cluster ions being generated from oxygen and moisture during ionization of oxygen gas containing moisture as an impurity. Accordingly, by using this calibration curve, a quantitative analysis of a concentration of trace moisture in oxygen is made possible with a high sensitivity at the level of parts per billion.

In addition, since measurements with regard to a standard gas to be used in preparation of a calibration curve are conducted using a mass spectrometer 6 immediately after moisture is added to a gas in a calibration line 10 within a short period at a fixed temperature and the moisture concentration is adjusted, there is no risk of the moisture concentration in the standard gas changing with the passage of time due to reaction between oxygen and moisture, or the like, and an accurate calibration curve can be constantly obtained instantly.

Furthermore, when conducting a measurement with regard to a sample gas, a quantitative analysis of moisture can be conducted quickly, simply by measuring a relative ion intensity of cluster ions under the same conditions as in the preparation of the calibration curve and reading in the calibration curve the moisture concentration corresponding to the measured value.

It should be noted that although an example in which an analysis of moisture in oxygen is conducted is described in the above first working example, the analytical method of the present invention should not be restricted to such an example; the analytical method of the present invention is also applicable to an analysis of a sample gas in which an impurity forms cluster ions with a main component when the sample gas is ionized.

For example, an analysis of ammonia gas containing gas-phase moisture as an impurity is possible in a manner similar to the above first working example, using a device as shown in FIG. 1, since it is known that ammonia and moisture form cluster ions.

In the following, a second working example of an analytical method according to the present invention will be illustrated by an example in which ammonia gas is analyzed for moisture.

An analytical device used in this working example may be one similar to the device in FIG. 1, except that a high purity ammonia gas cylinder is used as a sample gas cylinder 1.

First, in order to prepare a calibration curve, a sample gas which is supplied from the high purity ammonia gas cylinder 1 is allowed to pass the calibration line 10 so as to yield a standard gas, and thereafter, measurements are conducted by setting the switching valves 3 and 5 so that the standard gas can be directed to the mass spectrometer 6.

In this working example, the standard gas which is introduced into the mass spectrometer 6 is ionized, whereby ammonia and moisture in the standard gas form cluster ions; cluster ions having ratios of the mass number M to the charge Z (M/Z) of 35 ($NH_3^+.H_2O$) and 36 ($NH_4^+.H_2O$), which originated from moisture, are generated. Generation ratios of these cluster ions vary depending on ionization conditions in the mass spectrometer 6.

Then, relative ion intensities of each type of cluster ion are measured while varying the moisture concentration in the standard gas by appropriately setting ionization conditions and varying the amount of moisture added by the impurity adding means 12; thus, calibration curves showing relationships between the moisture concentration and the relative ion intensity of cluster ions are prepared.

Figure 7:
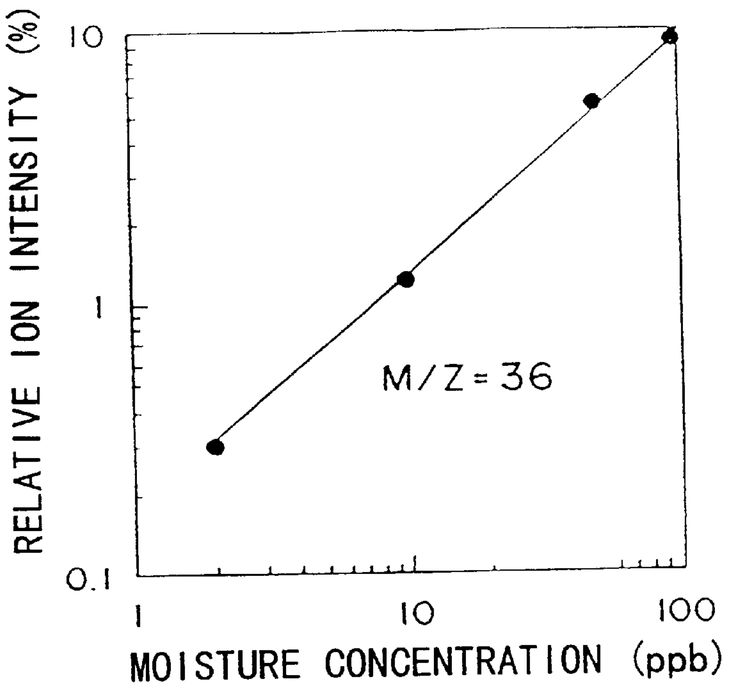
FIG. 7 is a graph showing a relationship between the moisture concentration and the relative ion intensity of cluster ions with regard to an ammonia gas containing gas-phase moisture.

FIG. 7 shows an example of the thus-obtained calibration curve representing a relationship between the moisture concentration and the relative ion intensity of cluster ions of M/Z=36.

In this working example, the calibration curve for cluster ions of M/Z=35 ($NH_3^+.H_2O$) and the calibration curve for cluster ions of M/Z=36 ($NH_4^+.H_2O$) both show good linearity.

Accordingly, either one of calibration curves for cluster ions of M/Z=35 and cluster ions of M/Z=36 may be used as a calibration curve for quantifying moisture in ammonia gas. In addition, a quantitative analysis of moisture is also possible using a calibration curve representing a relationship between the total value of relative ion intensities of both types of cluster ions and the moisture concentration.

In addition, measurements of the sample gas can be conducted in a manner similar to that in the above first working example. That is, the switching valves 3 and 5 are switched so that the sample gas from the high purity ammonia gas cylinder 1 will be directed via the analysis line 4 to the mass spectrometer 6, and then the measurement is conducted under the same measuring conditions as those in the preparation of the calibration curve. A quantitative analysis of moisture in the sample gas is possible by measuring a relative ion intensity (%) of cluster ions which are of the same type as those used in preparation of the calibration curve, and reading a moisture concentration corresponding to the value of the measured relative ion intensity in the calibration curve which has been prepared in advance.

According to this working example, a calibration curve having good linearity can be obtained by finding a relationship between the relative ion intensity of cluster ions of ammonia and moisture, which are generated during ionization of ammonia gas containing moisture as an impurity, and the moisture concentration. Accordingly, by using this calibration curve, a quantitative analysis of concentrations of trace moisture in ammonia is made possible with a high sensitivity at the level of parts per billion.

Furthermore, the present inventors have found that when oxygen gas containing xenon as an impurity is ionized, oxygen and xenon form cluster ions, and they have ascertained that a quantitative analysis of xenon in oxygen is possible according to the analytical method of the present invention.

In the following, a third working example of an analytical method according to the present invention will be illustrated by an example in which oxygen gas is analyzed for xenon content.

An analytical device used in this working example is a device as shown in FIG. 1, in which an ultrahigh purity oxygen gas cylinder is used as the sample gas cylinder 1. In addition, as the impurity removing means 11, one in which a porous adsorbent is cold-trapped at a suitable temperature between −183° C. and −108° C., for example, may be preferably used; as the impurity adding means 12, a permeation tube (produced by KIN-TEK Co., U.S.A.), for example, may preferably be used.

First, in order to prepare a calibration curve, a sample gas which is supplied from the ultrahigh purity oxygen gas cylinder 1 is allowed to pass the calibration line 10 so as to yield a standard gas, and thereafter, measurements are conducted by setting the switching valves 3 and 5 so that the standard gas can be directed to the mass spectrometer 6.

In this working example, the standard gas which is introduced into the mass spectrometer 6 is ionized, whereby oxygen and isotopes of xenon in the standard gas form cluster ions, respectively; cluster ions having ratios of the mass number M to the charge Z (M/Z) of 161, 163, 164, 166, and 168 (all of $O_2.Xe^+$), which originated from xenon, are generated. Generation ratios of these cluster ions vary depending on ionization conditions in the mass spectrometer 6.

Then, relative ion intensities of each type of cluster ion are measured while varying the xenon concentration in the standard gas by appropriately setting ionization conditions and varying the amount of xenon added by the impurity adding means 12; thus, calibration curves showing relationships between the xenon concentration and the relative ion intensity of cluster ions are prepared.

Figure 8:
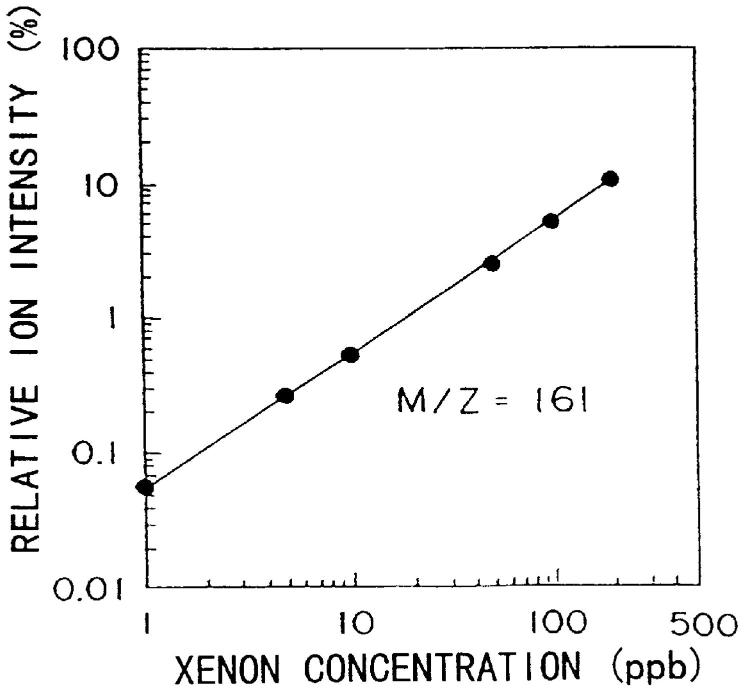
FIG. 8 is a graph showing a relationship between the xenon concentration and the relative ion intensity of cluster ions with regard to an oxygen gas containing xenon.

FIG. 8 shows an example of a calibration curve representing a relationship between the xenon concentration and the relative ion intensity of cluster ions of M/Z=161.

In this working example, the calibration curves for cluster ions of M/Z=161, 163, 164, 166, and 168 all show good linearity.

Accordingly, at least one of the calibration curves for these cluster ions may be used as a calibration curve for quantifying xenon in oxygen gas. In addition, a quantitative analysis of xenon is also possible by using a calibration curve representing a relationship between the total values of relative ion intensities of two or more types of these cluster ions and the xenon concentration.

In addition, a measurement with regard to the sample gas can be conducted in a manner similar to that of the above first working example. That is, the switching valves 3 and 5 are switched so that the sample gas from the ultrahigh purity oxygen gas cylinder 1 will be directed via the analysis line 4 to the mass spectrometer 6, and then the measurement is conducted under the same measuring conditions as those in the preparation of the calibration curve.

Figure 6:
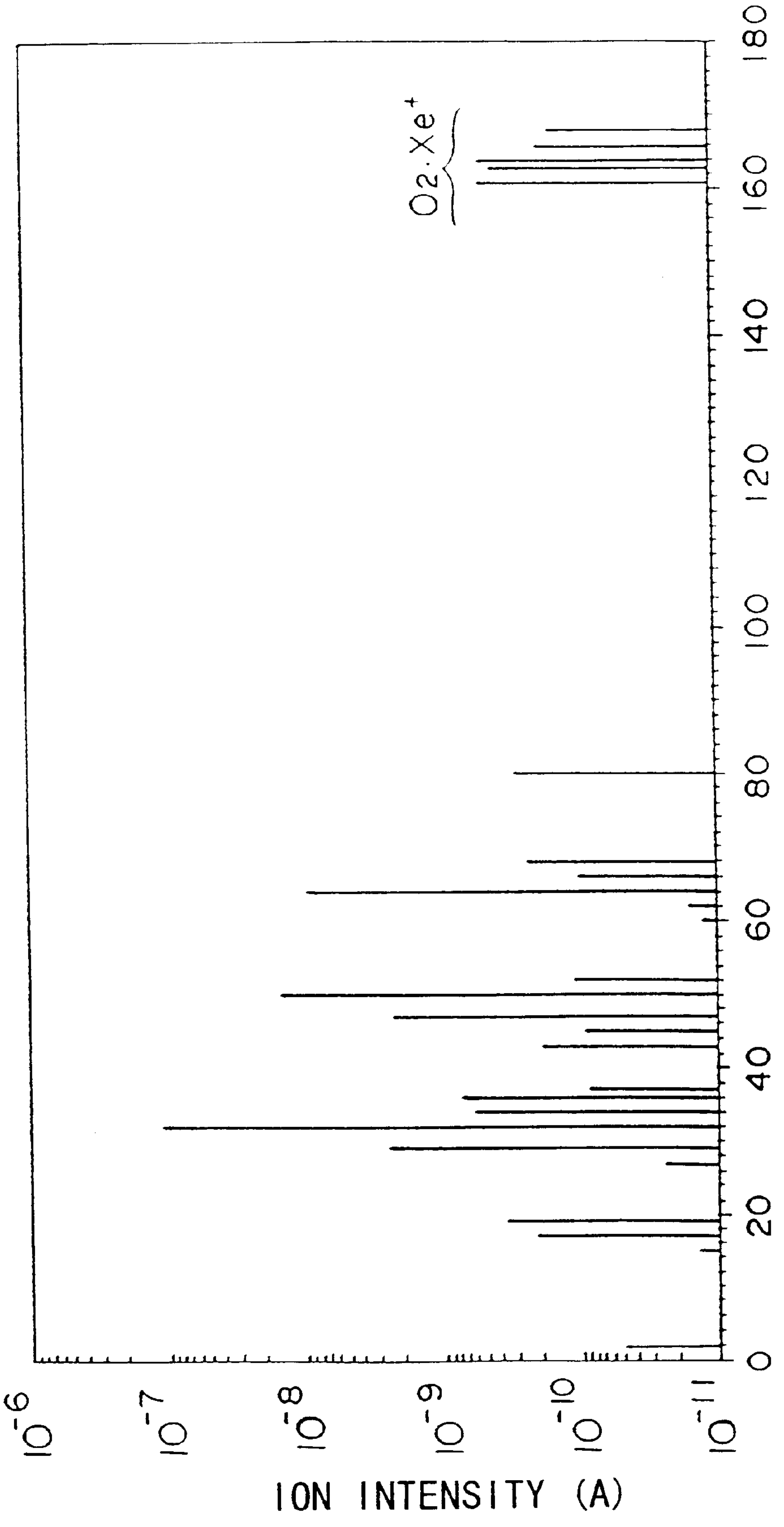
FIG. 6 is a graph showing an example of a mass spectrum obtained by an analysis of xenon in an ultrahigh purity oxygen gas.

FIG. 6 is a graph showing an example of a mass spectrum of a sample gas in an ultrahigh purity oxygen gas cylinder 1, which was measured by a mass spectrometer 6. At M/Z=161, 163, 164, 166, and 168, respective peaks are observed. A quantitative analysis of xenon in the sample gas is possible by measuring a relative ion intensity of cluster ions which are of the same type as those used in preparation of the calibration curve, and reading a xenon concentration corresponding to the value of the measured relative ion intensity in the calibration curve which has been prepared in advance.

According to this working example, a calibration curve having good linearity can be obtained by finding a relationship between the relative ion intensity of cluster ions of oxygen and xenon and the xenon concentration, the cluster ions being formed of oxygen and xenon and having been generated during ionization of oxygen gas containing xenon as an impurity. Accordingly, by using this calibration curve, a quantitative analysis of a concentration of trace xenon in oxygen is made possible with a high sensitivity at the level of part per billion.

INDUSTRIAL APPLICABILITY

As explained above, according to the present invention, an impurity gas in a sample gas is quantified by ionizing the sample gas, and measuring by a mass spectrometer the intensity of cluster ions which are formed from a main component gas and an impurity gas in the sample gas. According to the present invention, a gas in which a main component and an impurity form cluster ions can be analyzed with a high sensitivity; a highly-sensitive analysis of such a gas has hitherto been difficult using an analytical method employing an atmospheric-pressure-ionization mass spectrometer.

Moreover, in the analytical method according the present invention, a standard gas consisting of a main component gas and an impurity gas with a known concentration is ionized, the intensity of cluster ions, which are formed from the main component gas and the impurity gas, is measured by a mass spectrometer, a calibration curve which represents a relationship between the concentration of the impurity gas and the intensity of the cluster ions is obtained, and quantification of the impurity gas in the aforesaid sample gas can be conducted using the calibration curve. According to this analytical method, since a relationship between the relative ion intensity of the cluster ions (which are generated from the main component and the impurity when the sample gas is ionized) and the concentration of the impurity shows good linearity, a calibration curve with a high sensitivity can be obtained. Accordingly, by using such a calibration curve, a quantitative analysis of a concentration of the impurity in the sample gas is made possible with a high sensitivity. Moreover, an easy and quick quantitative analysis of the impurity is possible simply by measuring a relative ion intensity of cluster ions in the sample gas which has been ionized, and reading the concentration of the impurity corresponding to the value of the measured relative ion intensity in the calibration curve.

Furthermore, in the method of analysis of an impurity in a gas, by using as a standard gas a gas obtained immediately after adjusting the concentration of the impurity in the aforesaid sample gas, change in the concentration of the impurity in the standard gas with the passage of time due to reaction between the main component and the impurity in the sample gas, or the like, can be avoided, and an accurate calibration curve can be constantly obtained.

In addition, an embodiment of the analytical method according to the present invention is one which may be employed preferably in an analysis of a sample gas in which a main component gas is oxygen and an impurity gas is moisture. In this case, it is preferable that the intensity of ions having a ratio of a mass number M to a charge Z (M/Z) of 50 be applied to the intensity of the cluster ions; this will result in a highly-sensitive quantitative analysis of a moisture concentration in an oxygen gas.

Another embodiment of the analytical method according to the present invention is one which may be employed preferably in an analysis of a sample gas in which a main component gas is ammonia and an impurity gas is moisture. In this case, it is preferable that the intensity of at least one type of ion having a ratio of a mass number M to a charge Z (M/Z) of 35 or 36 be applied to the intensity of the cluster ions; this will result in a highly-sensitive quantitative analysis of a moisture concentration in an ammonia gas.

Yet another embodiment of the analytical method according to the present invention is one which may be employed preferably in an analysis of a sample gas in which a main component gas is oxygen and an impurity gas is xenon. In this case, it is preferable that the intensity of at least one type of ion having a ratio of a mass number M to a charge Z (M/Z) of 161, 163, 164, 166, or 168 be applied to the intensity of the cluster ions; this will result in a highly-sensitive quantitative analysis of a xenon concentration in an oxygen gas.

A device for analysis of an impurity in a gas according to the present invention is characterized by comprising a mass spectrometer having a means for ionizing a gas which is introduced thereinto, an analysis line which introduces a sample gas into the aforesaid mass spectrometer, and a calibration line which adjusts a concentration of an impurity in the sample gas and thereafter introduces the gas into the aforesaid mass spectrometer. According to the analytical device of the present invention, both measurements for preparing a calibration curve and measurements for analyzing the sample gas can be easily and quickly conducted immediately as desired by switching between the analytical line and the calibration line. In addition, since this analytical device has the calibration line for adjusting a concentration of the impurity in the sample gas, a sample gas can be made into a standard gas thereby, and the standard gas obtained immediately after a concentration of the impurity is adjusted can be introduced into the mass spectrometer. Accordingly, change of the standard gas, which is used for making a calibration curve, with the passage of time can be avoided, and an accurate calibration curve can be constantly obtained.

The aforesaid calibration line may preferably comprise a means for removing an impurity in the sample gas and a means for adding an impurity after the removal, whereby the standard gas can be obtained immediately as desired from the sample gas.

We claim:

1. A method of analyzing a sample gas having a main component gas and an impurity component gas, comprising:

removing an amount of impurity component gas from said sample gas;

adding a known amount of gas, consisting essentially of the impurity component gas, to said sample gas thereby forming a standard gas having a known concentration of said impurity component gas;

supplying said standard gas into a mass spectrometer;

ionizing the standard gas so as to produce standard gas cluster ions;

measuring an intensity of said standard gas cluster ions;

generating a calibration curve based on said known concentration of said impurity component gas and on said measured intensity of said standard gas cluster ions;

supplying said sample gas into said mass spectrometer;

ionizing the sample gas so as to produce sample gas cluster ions;

measuring an intensity of said sample gas cluster ions formed in said ionizing step; and determining a concentration of said impurity component gas in said sample gas based on said intensity of the sample gas cluster ions and said calibration curve.

2. A method according to claim 1, wherein said main component is oxygen, said impurity component gas is moisture, and said measuring of an intensity of sample gas cluster ions is performed by measuring an intensity of ions having a ratio of a mass number M to a charge Z (M/Z) of 50.

3. A method according to claim 1, wherein said main component is ammonia, said impurity component gas is moisture, and said measuring of an intensity of sample gas cluster ions is performed by measuring an intensity of ions having a ratio of a mass number M to a charge Z (M/Z) wherein M/Z is 35 or 36.

4. A method according to claim 1, wherein said main component gas is oxygen, said impurity component gas is xenon, and said measuring of an intensity of sample gas cluster ions is performed by measuring an intensity of isotopic ions having a ratio of a mass number M to a charge Z (M/Z) wherein M/Z is 161, 163, 164, 166, or 168.

5. A method according to claim 1, wherein said ionizing the sample gas is performed so as to yield a highest relative ion intensity of said sample gas cluster ions.

6. A method according to claim 5, wherein said ionizing is performed by adjusting a drift voltage condition.

7. A method according to claim 1, wherein said measuring an intensity of said sample gas cluster ions is performed by an atmospheric-pressure-ionization mass spectrometer.

8. A device for analyzing a sample gas having a main component gas and an impurity component gas, comprising:

a mass-spectrometer configured to ionize said sample gas, an analysis line configured to introduce said sample gas into said mass spectrometer, and a calibration line configured to add a known amount of gas consisting essentially of the impurity component gas, the sample gas thereby forming a standard gas, said calibration line being configured to introduce said standard gas into the mass spectrometer.

9. A device according to claim 8, wherein said calibration line comprises:

an impurity removal device configured to remove an amount of said impurity component gas from the sample gas.

10. A device according to claim 8, wherein said mass spectrometer comprises an atmospheric-pressure-ionization mass spectrometer.

11. A method according to claim 1, further comprising keeping a temperature of said standard gas and said sample gas substantially constant between a first time at which the measuring of the intensity of the standard gas cluster ions is performed and a second time at which the measuring of the intensity of the sample gas cluster ions is performed.

12. A method of measuring a concentration of xenon gas in oxygen gas, comprising:

calibrating an atmospheric-pressure-ionization mass spectrometer using a mixture of xenon and oxygen gases;

introducing a sample gas comprising xenon gas and oxygen gas in said atmospheric-pressure-ionization mass spectrometer;

ionizing said sample gas;

measuring an intensity of cluster ions formed by said ionizing; and determining the xenon gas concentration in the sample gas based on the measuring of intensity and said calibrating.

13. A method according to claim 12, wherein measuring the intensity is performed by measuring an intensity of ions having a ratio of a mass number M to a charge Z (M/Z) wherein M/Z is 161, 163, 164, 166, or 168.

* * * * *